(12) United States Patent
Sherman et al.

(10) Patent No.: US 11,271,438 B2
(45) Date of Patent: Mar. 8, 2022

(54) SYSTEM FOR WIRELESS POWER CHARGING

(71) Applicant: POWERMAT TECHNOLOGIES LTD., Neve Ilan (IL)

(72) Inventors: Itay Sherman, Hod Hasharon (IL); Ilya Gluzman, Holon (IL); Elieser Mach, Rosh Tzurim (IL); Amir Salhuv, Nes Ziona (IL); Sharon Ben-Itzhak, Rehovot (IL)

(73) Assignee: POWERMAT TECHNOLOGIES LTD., Neve Ilan (IL)

(*) Notice: Subject to any disclaimer, the term of this patent is extended or adjusted under 35 U.S.C. 154(b) by 311 days.

(21) Appl. No.: 16/304,831

(22) PCT Filed: Mar. 7, 2018

(86) PCT No.: PCT/IL2018/050260
§ 371 (c)(1),
(2) Date: Nov. 27, 2018

(87) PCT Pub. No.: WO2018/163172
PCT Pub. Date: Sep. 13, 2018

(65) Prior Publication Data
US 2020/0287425 A1  Sep. 10, 2020

Related U.S. Application Data

(60) Provisional application No. 62/535,987, filed on Jul. 24, 2017, provisional application No. 62/467,903, filed on Mar. 7, 2017.

(51) Int. Cl.
*H02J 50/60* (2016.01)
*H02J 50/80* (2016.01)
(Continued)

(52) U.S. Cl.
CPC ............... *H02J 50/60* (2016.02); *H02J 7/02* (2013.01); *H02J 50/12* (2016.02); *H02J 50/50* (2016.02); *H02J 50/80* (2016.02)

(58) Field of Classification Search
CPC .. H02J 50/60; H02J 50/80; H02J 50/12; H02J 50/50; H02J 7/02; H02J 50/005; H02J 50/10
See application file for complete search history.

(56) References Cited

U.S. PATENT DOCUMENTS 9,126,490 B2   9/2015  Cook et al.
2008/0079392 A1  4/2008  Baarman et al.
(Continued)

FOREIGN PATENT DOCUMENTS

WO   2011/097608 A2   8/2011
WO   2012058466 A1   5/2012
(Continued)

OTHER PUBLICATIONS

Extended European Search Report issued in European Application No. 18160589.0, dated May 24, 2018, 8 pages.
(Continued)

*Primary Examiner* — John W Poos
*Assistant Examiner* — Alex W Lam
(74) *Attorney, Agent, or Firm* — Volpe Koenig

(57) ABSTRACT

According to a first aspect of the present disclosed subject matter, a method for foreign object detection in a system having a relay adapted to inductively transfer power for charging a device and a transmitter having a controller configured to inductively transmit to the relay the power for charging the device, wherein the transmitter and the relay are separated by a medium, wherein the controller is capable of communicating with the device, the method comprising operations by the controller: determining power consumed
(Continued)

by the transmitter; determining power loss on the transmitter according to continuous measurements of AC output current; obtaining coupling factor between the transmitter and the relay; determining power loss on the relay based on continuous measurements of AC output current and coupling factor; subtracting from the power consumed by the transmitter the power loss on the transmitter and power loss on the relay; obtaining from the device consumed power of the device; comparing a result of the subtracting to the consumed power of the device; determining foreign object presence.

19 Claims, 4 Drawing Sheets

(51) Int. Cl.
*H02J 50/12* (2016.01)
*H02J 50/50* (2016.01)
*H02J 7/02* (2016.01)

(56) References Cited

U.S. PATENT DOCUMENTS

| | | | |
|---|---|---|---|
| 2008/0157603 A1 | 7/2008 | Baarman et al. | |
| 2009/0096413 A1 | 4/2009 | Partovi et al. | |
| 2009/0174263 A1 | 7/2009 | Baarman et al. | |
| 2010/0109445 A1 | 5/2010 | Kurs et al. | |
| 2010/0181841 A1 | 7/2010 | Azancot et al. | |
| 2011/0037322 A1* | 2/2011 | Kanno | H02J 7/025 |
| | | | 307/104 |
| 2011/0133569 A1 | 6/2011 | Cheon et al. | |
| 2011/0227530 A1 | 9/2011 | Karalis et al. | |
| 2011/0291790 A1 | 12/2011 | Okumura et al. | |
| 2012/0063505 A1 | 3/2012 | Okamura et al. | |
| 2012/0193993 A1 | 8/2012 | Azancot et al. | |
| 2012/0235503 A1 | 9/2012 | Kesler et al. | |
| 2013/0015699 A1 | 1/2013 | Mita | |
| 2013/0020862 A1 | 1/2013 | Miller | |
| 2013/0026851 A1 | 1/2013 | Taguchi | |
| 2013/0062965 A1 | 3/2013 | Chernokalov et al. | |
| 2013/0094598 A1* | 4/2013 | Bastami | H02J 50/80 |
| | | | 375/259 |
| 2013/0249479 A1 | 9/2013 | Partovi | |
| 2014/0015329 A1 | 1/2014 | Widmer et al. | |
| 2014/0015330 A1 | 1/2014 | Byun et al. | |
| 2014/0184150 A1 | 7/2014 | Walley | |
| 2014/0239735 A1 | 8/2014 | Abe et al. | |
| 2014/0265617 A1 | 9/2014 | Roy et al. | |
| 2015/0061585 A1 | 3/2015 | Obayashi et al. | |
| 2015/0249484 A1 | 9/2015 | Mach et al. | |
| 2015/0303995 A1 | 10/2015 | Staring et al. | |
| 2015/0372496 A1 | 12/2015 | Lee et al. | |
| 2016/0056637 A1* | 2/2016 | Hwang | H02J 7/025 |
| | | | 307/104 |
| 2016/0056664 A1 | 2/2016 | Partovi | |
| 2016/0181818 A1 | 6/2016 | Joye et al. | |
| 2016/0181822 A1 | 6/2016 | Yang et al. | |
| 2016/0254701 A1 | 9/2016 | Tsuda et al. | |
| 2016/0329753 A1 | 11/2016 | Gluzman et al. | |
| 2017/0018977 A1 | 1/2017 | Van Wageningen et al. | |
| 2017/0054330 A1 | 2/2017 | You et al. | |
| 2017/0163070 A1 | 6/2017 | Lawrenson et al. | |
| 2017/0353046 A1* | 12/2017 | Chen | H02J 7/0044 |
| 2020/0287419 A1 | 9/2020 | Sherman et al. | |
| 2020/0321806 A1 | 10/2020 | Sherman et al. | |
| 2020/0328617 A1 | 10/2020 | Sherman et al. | |

FOREIGN PATENT DOCUMENTS

| | | |
|---|---|---|
| WO | 2013/036947 A2 | 3/2013 |
| WO | 2013056234 A2 | 4/2013 |
| WO | 2015150107 A1 | 10/2015 |
| WO | 2017012979 A1 | 1/2017 |
| WO | 2017134101 A1 | 8/2017 |

OTHER PUBLICATIONS

Extended European Search Report issued in European Application No. 18160590.8, dated May 11, 2018, 8 pages.
Extended European Search Report issued in European Application No. 18160592.4, dated Jun. 4, 2018, 8 pages.
Extended European Search Report issued in European Application No. 18160593.2, dated May 25, 2018, 8 pages.
International Preliminary Report issued in International Application No. PCT/IL2018/050256, dated Sep. 19, 2019, 6 pages.
International Preliminary Report issued in International Application No. PCT/IL2018/050258, dated Sep. 19, 2019, 6 pages.
International Preliminary Report issued in International Application No. PCT/IL2018/050260, dated Sep. 19, 2019, 6 pages.
International Preliminary Report issued in International Application No. PCT/IL2018/050266, dated Sep. 19, 2019, 6 pages.
International Search report and Written Opinion issued in International Application No. PCT/IL2018/050256, dated Jul. 4, 2018, 26 pages.
International Search report and Written Opinion issued in International Application No. PCT/IL2018/050258, dated Jul. 5, 2018, 24 pages.
International Search report and Written Opinion issued in International Application No. PCT/IL2018/050260, dated Jul. 5, 2018, 10 pages.
International Search report and Written Opinion issued in International Application No. PCT/IL2018/050266, dated Jul. 2, 2018, 24 pages.
"Wireless power transfer," https://en.wikipedia.org/wiki/Wireless_power_transfer, Available at: https://web.archive.org/web/20170302161952/https://en.wikipedia.org/wiki/Wireless_power_transfer (Mar. 2, 2017).
Notice of Opposition to a European Patent dated Jul. 14, 2020 for European Patent Application No. EP 18160592.4.

\* cited by examiner

SYSTEM FOR WIRELESS POWER CHARGING

CROSS-REFERENCE TO RELATED APPLICATIONS

The present application is a National Phase filing under 35 U.S.C. § 371 of International Patent Application No. PCT/IL2018/050260, filed Mar. 7, 2018, which is based upon and claims under 35 U.S.C. § 119(e) the benefit of the priority dates of U.S. Provisional Patent Application Ser. No. 62/467,903, by Itay Sherman, Elieser Mach, Ilya Gluzman, and Amir Salhuv, titled "Large Range Inductive Tx," filed Mar. 3, 2017, and U.S. Provisional Patent Application Ser. No. 62/535,987, by Itay Sherman, Elieser Mach, Sharon Ben-Itzhak, and Amir Salhuv, titled "Smart Inductive Extensions," filed Jul. 24, 2017, each of which is expressly incorporated herein by reference for all purposes in its entirety.

TECHNICAL FIELD

The present disclosed subject matter relates to wireless power charging systems. More particularly, the present disclosed subject matter relates to induction charging through medium and methods for foreign object detection.

BACKGROUND

Growing demand for wireless power charging systems led to dramatic deployments increase, in a wide variety of venues, and raises the need for increasing the effective charging distance between a transmitter and a receiver. Commercially available systems are limited to a maximum distance of approx. 10 millimeters between a transmitter and a receiver of such systems.

Wireless power charging systems are usually deployed in public facilities such as restaurants, coffee shops, airports, bus stations; train stations, banks, schools, libraries, hotels, official building, or the like. Typically, the systems are installed on top of surfaces, such as tables, bars, or the like that are accessible to users, thus require decorative appearance and hazards free installation. Meeting these requirements on one hand and distance limitations on the other, requires wiring to be routed on top of the surface as well as drilling the surface to meet the distance limitation. In some cases, the transmitter of such commercially available systems can be installed inside the cutout hole in the surface. This complicates the installation and raises its cost, on top of damaging the customer's furniture.

Clearly, such commercially available solutions are not desired in the consumers marketplace. Moreover, the wireless power charging level of these available solutions is limited for charging handheld devices requiring less than 15 watts.

BRIEF SUMMARY

According to a first aspect of the present disclosed subject matter, a method for foreign object detection in a system having a relay adapted to inductively transfer power for charging a device and a transmitter having a controller configured to inductively transmit to the relay the power for charging the device, wherein the transmitter and the relay are separated by a medium, wherein the controller is capable of communicating with the device, the method comprising operations by the controller: determining power consumed by the transmitter; determining power loss on the transmitter according to continuous measurements of AC output current; obtaining coupling factor between the transmitter and the relay; determining power loss on the relay based on continuous measurements of AC output current and coupling factor; subtracting from the power consumed by the transmitter the power loss on the transmitter and power loss on the relay; obtaining from the device consumed power of the device; comparing a result of the subtracting to the consumed power of the device; determining foreign object presence.

In some exemplary embodiments, the determining the power loss on repeater is also based on an operational frequency of the transmitter and joint resonance frequencies of the repeater and the transmitter.

In some exemplary embodiments, upon the determining foreign object presence the controller cease the inductively transfer power.

In some exemplary embodiments, upon the determining foreign object presence the controller changes the operational frequency for minimum inductively transfer power.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
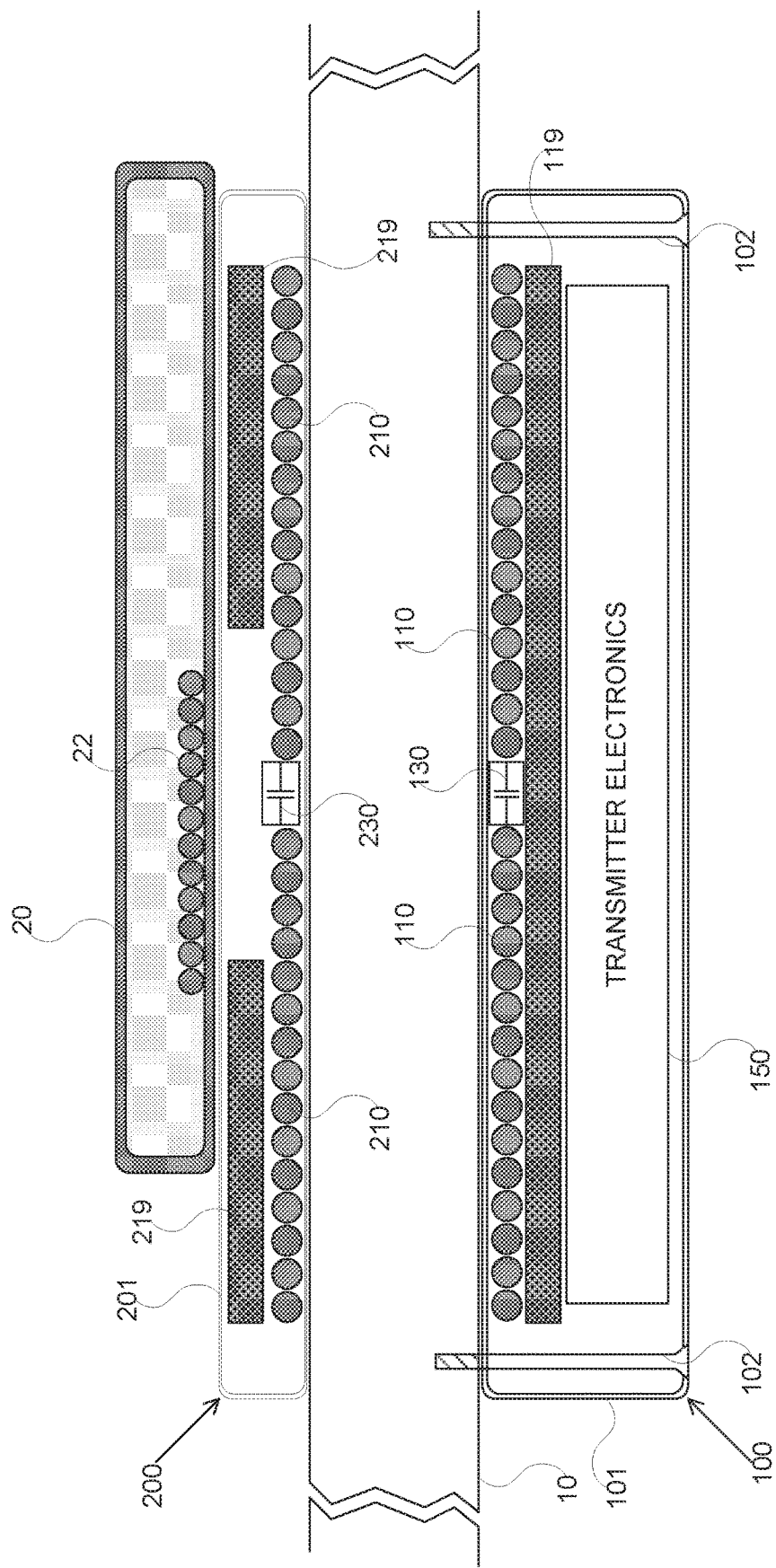
FIG. 1 shows a cross-section view of an installation of wireless power charging system, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Referring now to FIG. 1 showing a cross-sectional view of an installation of wireless power charging system, in accordance with some exemplary embodiments of the disclosed subject matter. The wireless power charging system may be comprised of a transmitter (Tx) 100 and at least one relay 200.

In some exemplary embodiments, Tx 100 may be mounted on one side of a medium 10, whereas the relay 200 may be mounted on the opposite side of the medium 10. The medium 10 may be made of any material that doesn't conduct electricity, such as for example wood, plastic granite, marble, a combination thereof, or the like. It will be noted that in the present disclosure, medium 10 refers to surfaces, such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec.) 150; all incorporated inside a transmitter enclosure (Tx enclosure) 101 that may be secured to medium 10 by fasteners 102.

In some exemplary embodiments, the relay 200 may comprise a relay coil (Lr) 210; a relay ferrite 219, and a relay capacitor (Cr) 230; all incorporated in a relay enclosure 201 that may be secured to an opposite side of medium 10. Enclosure 201 may have a shape and form factor of a mat, a pad, a saucer, a coaster, a combination thereof, or the like. The enclosure 201 of relay 200 can be secured to medium 10 by glue or any other method, which guarantee that relay 200 and Tx 100 overlap one another from both sides of medium 10. It will be noted that, relay 200 and Tx 100 overlap each other so that Lt 110 and Lr 210 shall be substantially aligned, to face one another, for optimizing the inductance between the two, as depicted in FIG. 1.

In some exemplary embodiments, Tx 100, with is powered by power supply (PS) 160 (not shown), can be configured to utilize relay 200 for inductively (wirelessly) charge device 20 placed on relay 200. Device 20 may be a user's device such as a tablet, a laptop a Smartphone, or any chargeable mobile handsets; which comprise a built-in coil 22 configured to receive inductive power and charge a battery of the device 20. It should be noted that, the built-in coil 22 refers to standard receiver's coils of the devices listed above, typically this standard receiver's coils have a diameter of approximately 40 millimeters.

It should be noted that, the terminology of components Lt 110, Lr 210/Lr 310 and coil 22 in the present disclosure correspond to: first Tx coil, second Tx coil and Rx coil, respectively, of the related provisional patent applications.

Similar to Lr 210 and Lt 110, coil 22 and Lr 210 may substantially face and overlap each other, i.e. centers of coil 22 and Lr 210 can be aligned, in order to meet one of the effective charging criteria's. To ensure the alignment, enclosure 201 of the relay 200 can be marked with a layout that indicates to a user, the optimal place for positioning device 20 on top of relay 200 so as to gain effective charging. However, the wireless power charging system may be adapted to provide power charging even if device 20 is not precisely positioned on top of relay 200 as depicted in FIG. 1.

In some exemplary embodiments, both Lr 210 and Lt 100 may be flat spiral air core coils, having a diameter greater than 100 mm The utilization of such large coils allows for relatively high coupling between Lr 210 and Lt 100 despite a thickness equal to or greater than 30 millimeters of medium 10. In the embodiment depicted in FIG. 1, the coupling factor between Lr 210 and Lt 100 may be greater than 0.25. The coupling between typical coil 22 and Lr 210 may be greater than 0.15 in the embodiment depicted in FIG. 1.

In some exemplary embodiments, Tx 100 comprises a transmitter ferrite (Tx-ferrite) 119. Tx-ferrite 119 can be a layer made of ferrite material with suitable magnetic characteristics of permeability & core losses. One technical reason for utilizing the Tx-ferrite 119 is providing a buffer for protecting Tx-electronics 150 from inductive energy. Another technical reason for utilizing the Tx-ferrite 119 can be to increase the magnetic field facing relay 200; thus, the inductance of the Lt 110. Tx-ferrite 119 properties such as thicknesses, flexibility, fragility a combination thereof, or the like can be dictated by an application in which the system of the present disclosure is provided. For example, the thickness and the material from which the medium 10 is made of. Since Lt 110 may have a shape of a circle, the shape of Tx-ferrite 119 may also be a circle, having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 200 may comprise a relay ferrite 219. Relay ferrite 219 may be a layer made of ferrite material similar to Tx-ferrite 119. One technical reason for utilizing the Relay ferrite 219 is to provide a buffer for protecting the electronic circuitry of device 20 from inductive energy. Another technical reason for utilizing the relay ferrite 219 may be to increase the magnetic field facing the Tx 100; thus, the inductance of Lr 210. Relay ferrite 219 possesses properties similar to the properties of Tx-ferrite 119. Since Lr 210 can have a shape of a circle, the shape of relay ferrite 219 can also be a circle having a diameter equal to or bigger than the Lr 210 external diameter. Alternatively, Relay ferrite 219 may have a shape of any geometric plane figure as long as Lr 210 external diameter is an inscribed circle within the geometric plane figure.

It should be noted that relay ferrite 219 requires a cutout situated at its center. The size of the cutout can be equal to or slightly larger than an external diameter of a typical receiver coil of a chargeable device, such as coil 22 of device 20. The shape of the cutout may be a circle or any geometric surface that surrounds coil 22 shape in order to allow passage of magnetic flux between Lr 210 and coil 22.

In some exemplary embodiments of the disclosed subject matter, at least one resonance capacitor (Ct) 130 can be connected in series to Lt 110 and at least one resonance capacitor (Cr) 230 can be connected in series to Lr 210. The resonant capacitors are placed inside the inner diameter space of each coil accordingly. Alternatively, the resonant capacitors can be placed next to the outer diameter space of each coil accordingly, or elsewhere within the respective enclosure.

The relay ferrite 219 of the present disclosure increases the coupling factor of coil 22 and Lr 210 to better simulate a behavior of a coil 22 with commercially available standard transmission coil, and also reduces any direct coupling from Lt 110 to coil 22, which is not desired in the system of the present disclosure. In addition, the resonance capacitors of both the Tx 100 and relay 200 are intended to stabilize the system operational point, dependency of coil 22 loads and allow high efficiency in power transfer. In some exemplary embodiments, the resonance frequency of Lt 110 and Ct 130, (i.e. Tx 100 LC circuit), can be set to be significantly lower than the resonance frequency of a typical coil such as coil 22 (approximately 100 kHz) and substantially lower than the resonance frequency of Lr 210 and Cr 230 (i.e. relay 200 LC circuit).

In some exemplary embodiments, a combination of the Tx 100 and the relay 200 LC circuits, when no load is present, may form two distinct resonance frequencies, hereinafter, joint resonance frequencies (JRF). The first resonance frequency of the JRF, may be adjacent to Tx 100 LC circuit's resonance frequency; however, lower in any case. The second resonance frequency of JRF may be adjacent to relay 200 LC circuit's resonance frequency, however higher in any case. It should be noted that the phrase "a combination of the Tx 100 and the relay 200 LC circuits" refers in the present disclosure to a state where Tx 100 and relay 200 face each other, such as depicted in FIG. 1 and power is applied to the Tx 100. It should also be noted that the second resonance frequency, i.e. higher resonance frequency, shall be regarded as the present disclosure system main resonance frequency (MRF).

The resonance frequency of Tx 100 LC circuit and relay 200 LC circuit are designed in such a way that their JRF, with no Coil 22 on them, is tuned to be a specific range (typically 20-50 kHz) lower than the desired maximal operational frequency of the Tx100 and is higher than coil 22 resonance frequency.

As an example, the inductance of Lt 110 may be approximately 30 µH; the capacitance of Ct 130 may be approximately 290 µF which provides a Tx 100 LC circuit's resonance frequency of approximately 54 kHz. Whereas, the inductance of Lr 210 may be approximately 60 µH; the capacitance of Ct 130 may be approximately 37.5 µF which provides a relay 200 LC circuit's resonance frequency of approximately 106 kHz. In such preferred exemplary embodiment, the system MRF may be 117 kHz (i.e. higher than 106 kHz of the relay 200 LC circuit's resonance frequency) providing that the gap between installed relay 200 and Tx 110 may be approximately 30 millimeters. Also, the outer diameter of Lt110 and Lr210 may be approximately 125 millimeters, whereas the cutout diameter in ferrite 219 may be approximately 55 millimeters In some exemplary embodiments, an operating frequency (OPF) may range between 121 kHz-140 kHz, where the lower OPF of the range may be 4kHz higher than the MRF, i.e. 117 kHz. and maximal frequency may be 5 kHz lower than a regulatory limit, i.e. 145 kHz. Alternatively, the maximal OPF may be set below the MRF and the regulatory maximal frequency limit. For an installation having similar coils as the example described above, with a medium 10 thickness of 0.5", the MRF may be at 140 kHz. Thus, the operational range may be set to 115 kHz-136 kHz, were the maximal frequency is 4 kHz lower than the MRF and lower than the regulatory limit.

It will be understood that the system of the present disclosed avoids operation at resonance frequencies. The preferred OPF of the present disclosure system may be at a range of frequencies that are shifted to a frequency either lower or higher than the main resonance frequency (MRF).

Figure 2:
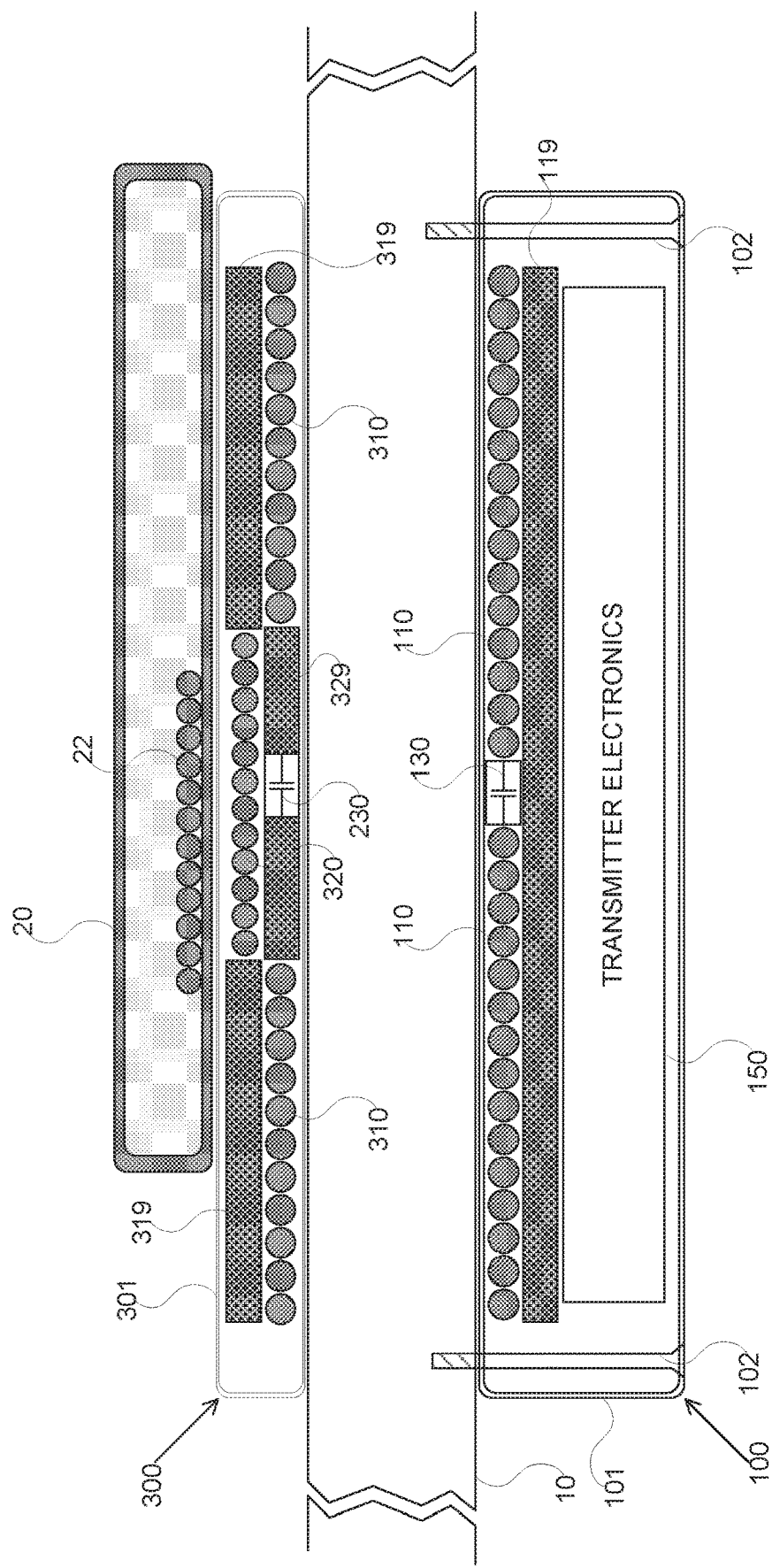
FIG. 2 shows a cross-section view of an installation of another wireless power charging system, in accordance with some exemplary embodiments of the disclosed subject matter.

Referring now to FIG. 2 showing a cross-sectional view of an installation of another wireless power charging system, in accordance with some exemplary embodiments of the disclosed subject matter.

In some exemplary embodiments, Tx 100 may be mounted on one side of a medium 10, whereas the relay 300 may be mounted on the opposite side of the surface 10. The medium 10 can be made of any material that doesn't conduct electricity, such as for example wood, plastic granite, marble, a combination thereof, or the like. It will be noted that in the present disclosure, medium 10 refers to surfaces such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec.) 150; all incorporated inside a transmitter enclosure (Tx enclosure) 101 that is secured to medium 10 by fasteners 102.

In some exemplary embodiments, the relay 300 comprises a relay coil (Lr) 310; a second relay coil (sLr) 320; a relay ferrite 319; a second relay ferrite 329 and a relay capacitor (Cr) 330; all incorporated in a relay enclosure 301 that may be secured to an opposite side of medium 10. Enclosure 301 can have a shape and form factor of a mat, a pad, a saucer, a coaster, a combination thereof, or the like. The relay 300 enclosure 301 can be secured to medium 10 by glue or any other method that guarantee that relay 300 and Tx 100 overlap to one another from both sides of medium 10. It will be noted that relay 300 and Tx 100 overlap each other so that Lt 110 and Lr 310 shall be substantially aligned so as to face one another, for optimizing the inductance between the two, as depicted in FIG. 2.

In some exemplary embodiments, Tx 100 is powered by power supply (PS) 160 (not shown in FIG. 2, shown in FIG. 3), may be configured to utilize relay 300 for inductively (wirelessly) charge device 20 placed on relay 300. Device 20 may be a user's device such as a tablet, a laptop a Smartphone, or any chargeable mobile handsets, that comprise a built-in coil 22 configured to receive inductive power and charge a battery of the device 20.

In some exemplary embodiments of the disclosed subject matter, relay 300 may further comprise a secondary relay coil sLr 320 that can be electrically connected in series with Lr 310. Instead, Lr 310 can be arranged in two parts that are situated in two planer heights, wherein the inner coil (i.e. sLr 320) or alternatively part of Lr 310 is elevated compared to the outer part of Lr 310 that face Lt 110.

Coil 22 and sLr 320 can substantially face and overlap each other, i.e. centers of coil 22 and sLr 320 are align in order to meet one of the effective charging criteria's. For alignment, enclosure 301 of the relay 300 may be marked with a layout that indicates to a user the optimal place for positioning device 20 on top of relay 300 in order to gain effective charging. However, the wireless power charging system may be adapted to provide power charging even if device 20 is not precisely positioned on top of relay 300 as depicted in FIG. 2.

In some exemplary embodiments, both Lr 310 and Lt 100 may be flat spiral air core coils having a diameter greater than 100 mm, while sLr 320, also having a flat spiral air core coil, may have a smaller diameter that suits typical receiver's coils such as coil 22. The utilization of such large coils allows relatively high coupling between Lr 310 and Lt 100 in order to overcome a thickness equal to or greater than 30 mm of medium 10. In the embodiment depicted in FIG. 2, the coupling factor between Lr 310 and Lt 100 may be greater than 0.25, for medium thickness of up to 30 millimeters. The coupling between typical coil 22 and sLr 320 may be greater than 0.15 in the embodiment depicted in FIG. 2.

It should be noted that sLr 320 may not be directly influenced by Lt 110 because the second relay ferrite 329 blocks the magnetic field (to be described in detail further below); however, the same current induced to Lr 310 flows through sLr 320, since Lr 310 and sLr 320 are connected in series.

In some exemplary embodiments, Tx 100 may comprise a transmitter ferrite (Tx-ferrite) 119. Tx-ferrite 119 may be a layer made of ferrite material with suitable magnetic characteristics of permeability & core losses. One technical reason for utilizing the Tx-ferrite 119 may be to provide a buffer for protecting the Tx-elec. 150 from inductive energy. Another technical reason for utilizing the Tx-ferrite 119 may be to increase the magnetic field facing relay 300, and thus the inductance of Lt 110. Tx-ferrite 119 properties such as thicknesses, flexibility, fragility a combination thereof, or the like may be dictated by an application in which the system of the present disclosure may be provided. For example, the thickness and the material from which the medium 10 is made of. Since Lt 110 may have a shape of a circle, the shape of Tx-ferrite 119 may also be a circle having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 300 may comprise a relay ferrite 319. Relay ferrite 319 can be a layer made of ferrite material similar to Tx-ferrite 119. One technical reason for utilizing the Relay ferrite 319 may be to provide a buffer for protecting the electronic circuitry of device 20 from inductive energy. Another technical reason for utilizing the relay ferrite 319 is to increase the magnetic field facing the Tx 100; thus, increase the inductance of Lr 310. Relay ferrite 319 may possess properties similar to the properties of Tx-ferrite 119. Since Lr 310 may have a shape of a circle, the shape of relay ferrite 319 may also be a circle having a diameter equal to or bigger than the Lr 310 external diameter. Alternatively, relay ferrite 319 can have a shape of any geometric plane figure as long as Lr 310 external diameter is an inscribed circle within the geometric plane figure.

It should be noted that relay ferrite 319 may require a cutout situated at its center. The size of the cutout may be equal or slightly larger than an external diameter of a typical receiver coil of a chargeable device such as coil 22 of device 20. The shape of the cutout may be a circle or any geometric plane that surround coil 22 shape in order to allow magnetic flux to pass between Lr 310 and coil 22.

In some exemplary embodiments of the disclosed subject matter, the relay 300 further comprises a second relay ferrite 329 configured to block magnetic field induced by Lt 110 to sLr 320 and enhance the sLr 320 inductance toward coil 22. The second relay ferrite 329 possesses properties similar to the properties of Tx-ferrite 119 and relay ferrite 319. The shape ferrite 329 may be equal to or slightly larger than the cutout shape of relay ferrite 319. Practically, the cutout of relay ferrite 319 can be used as ferrite 329 that is situated inside the inner diameter of Lr 310 and at the same plane, while the sLr 320 may be situated on top of ferrite 229.

In some exemplary embodiments of the disclosed subject matter, at least one resonance capacitor (Ct) 130 can be connected in series to Lt 110 and at least one resonance capacitor (Cr) 330 may be connected in series to Lt 310. The resonant capacitors may be placed inside the inner diameter space of each coil accordingly. Alternatively, the resonant capacitors can be placed next to the outer diameter space of each coil accordingly, or elsewhere within the respected enclosure.

The relay ferrite 319 of the present disclosure increases the coupling factor of coil 22 and Lr 310 to better simulate a behavior of a coil 22 with commercially available standard transmission coil and also reduces any direct coupling from Lt 110 to coil 22, which is not desired in the system of the present disclosure. In addition, the resonance capacitors of both the Tx 100 and relay 300 are intended to stabilize the system operational point, dependency of coil 22 loads and allow for high efficiency in power transfer. In some exemplary embodiments, the resonance frequency of Lt 110 and Ct 130, (i.e. Tx 100 LC circuit) may be set to be significantly lower than the resonance frequency of a typical coil 22 (approximately 100 kHz) and substantially lower than the resonance frequency of Lr 310 and Cr 330 (i.e. relay 300 LC circuit).

In some exemplary embodiments, a combination of the Tx 100 and the relay 300 LC circuits, when no load is present, may form two distinct resonance frequencies, hereinafter, joint resonance frequencies (JRF). The first resonance frequency of JRF can be adjacent to Tx 100 LC circuit's resonance frequency, however, in any case, it will be lower.

The second resonance frequency of JRF, can be adjacent to relay 300 LC circuit's resonance frequency, however, it will be higher. It should be noted that the phrase "a combination of the Tx 100 and the relay 300 LC circuits" refers in the present disclosure to a state where Tx 100 and relay 300 face each other, as depicted in FIG. 2, and power is applied to the Tx 100. It should also be noted that the second resonance frequency, i.e. higher resonance frequency, shall be regarded in the present disclosure system as main resonance frequency (MRF).

The resonance frequency of Tx 100 LC circuit and relay 300 LC circuit are designed in such way that their JRF, with no Coil 22 on them, is tuned to be of a specific range (typically 20-50 kHz) that is lower than the desired maximal OPF of the Tx 100 and is higher than coil 22 resonance frequency.

In one preferred exemplary embodiment, the inductance of Lt 110 can be approximately 30 µH; the capacitance of Ct 130 can be approximately 290 µF which provides a Tx 100 LC circuit's resonance frequency of approximately 54 kHz. Whereas, the inductance of Lr 310 can be approximately 60 µH; the capacitance of Ct 130 can be approximately 37.5 µF which provides a relay 300 LC circuit's resonance frequency of approximately 106 kHz. In such preferred exemplary embodiment, the system MRF can be 117 kHz (i.e. higher than 106 kHz of the relay 300 LC circuit's resonance frequency) providing that the gap between the installed relay 300 and the Tx 110 can be approximately 30 millimeters. Also, the outer diameter of Lt110 and Lr310 may be approximately 125 millimeters, whereas the outer diameter of Lr320 may be approximately 55 millimeters.

In some exemplary embodiments, an OPF ranges between 121 kHz-140 kHz, where the lower OPF of the range can be 4 kHz higher than the MRF, i.e. 117 kHz., and the maximal frequency can be 5 kHz lower than a regulatory limit, i.e. 145 kHz. Alternatively, the maximal OPF can be set below the MRF and the regulatory maximal frequency limit. For an installation having similar coils as in the example described herein above, with a medium thickness of 0.5", the MRF can be at 140 kHz. Thus, the operational range can be set to 115 kHz-136 kHz, were the maximal frequency is 4 kHz lower than the MRF and lower than the regulatory limit.

Figure 3:
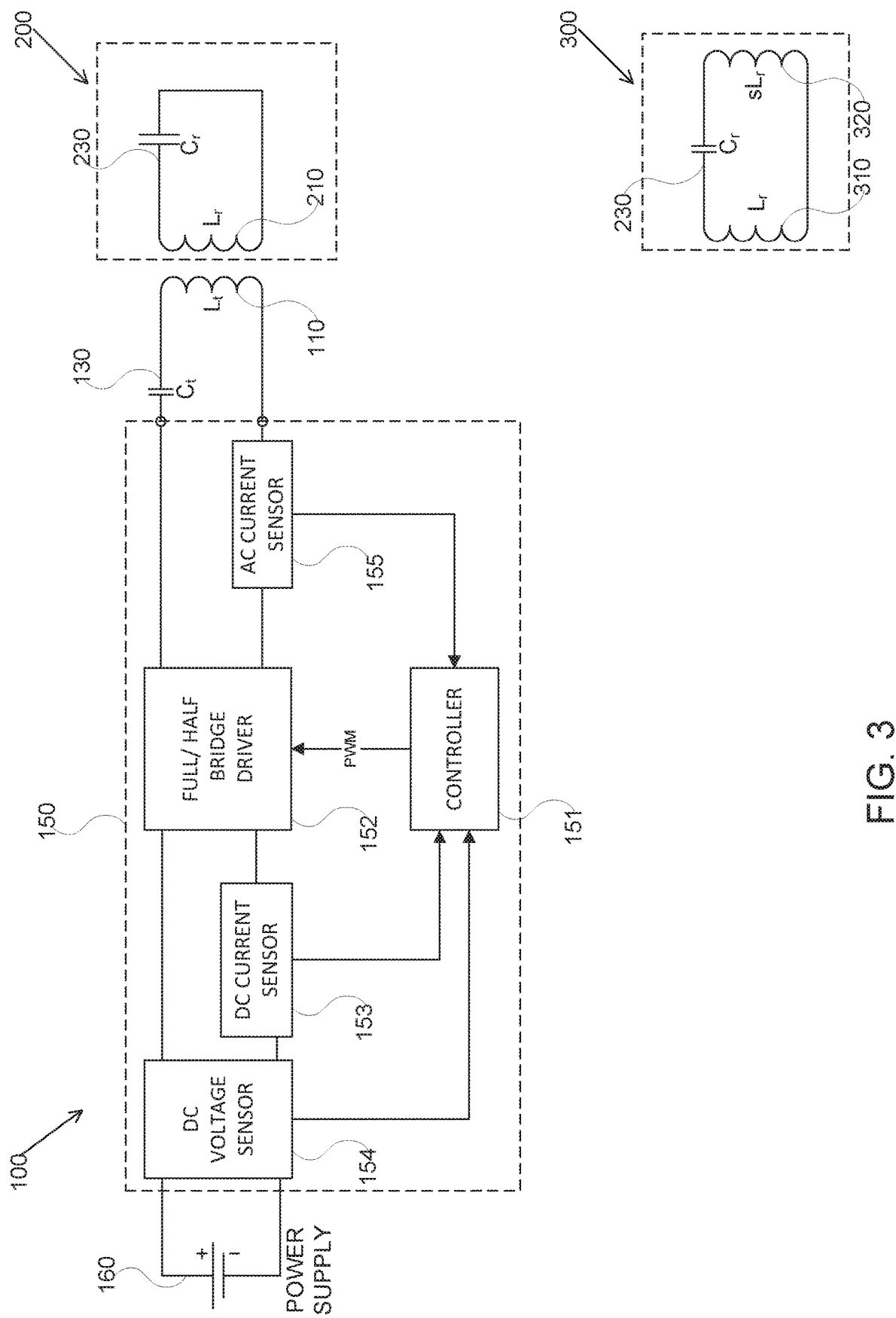
FIG. 3 shows a block diagram of a system for wireless power charging through medium, in accordance with some exemplary embodiments of the disclosed subject matter.

Referring now to FIG. 3 showing a block diagram of system for wireless power charging through medium, in accordance with some exemplary embodiments of the disclosed subject matter. The system for wireless power charging through medium comprises a PS 160, a Tx 100 transmitter and either a relay 200 or relay 300.

In some exemplary embodiments, the system can be adapted to utilize Tx 100 for charging a user's chargeable device, such as device 20 of FIGS. 1 and 2, via either a relay 200 or relay 300. Both relay 200 and relay 300 can be passive electronic circuit acting as repeaters for wirelessly transmitting charging energy to device 20 or the like. Relay 200 can comprise at least one coil (inductor) and one capacitor that form an LC resonance circuit, such as depicted in FIG. 1. An alternative relay, i.e. relay 300, can be provided in order to enhance the inductance and coupling with coil 22 of device 20. Relay 300 comprises at least two coils and one capacitor that form an LC resonance circuit such as the circuit depicted in FIG. 2.

In some exemplary embodiments, Tx 100 can comprise a transmitter electronics (Tx elect) 150, at least one Lx 110 coil, and a capacitor Ct 130, configured for inducing current in the coils of either relay 200 or relay 300, as depicted in FIG. 1 and FIG. 2 respectively.

In some exemplary embodiments, the Tx-elect 150 comprises of a controller 151; a full or half bridge driver 152, a DC current sensor 153, a DC voltage sensor 154, and an AC current sensor 155.

Controller 151 can be a central processing unit (CPU), a microprocessor, an electronic circuit, an integrated circuit (IC), or the like. Additionally, or alternatively, controller 151 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Controller 151 can be utilized to perform computations required by Tx 110 or any of its subcomponents.

In some exemplary embodiments of the disclosed subject matter, the controller 151 is configured to determine the following parameters:
a. DC voltage across PS 160 by acquiring and measuring an outcome of DC voltage sensor 154.
b. DC current supplied by PS 160 by acquiring and measuring an outcome of DC current sensor 153.
c. AC current supplied to Lt 110 by acquiring and measuring an outcome of AC current sensor 155. Alternatively, output AC current can be determined by sensing instantaneous current flowing to the driver from the power supply with DC current sensor 153.

It should be noted that determining parameters for AC current can comprise peak current, average of absolute current, RMS current, amplitude of first harmonic, and any combination thereof, or the like In some exemplary embodiments, controller 151 comprises a semiconductor memory component (not shown). The memory may be persistent or volatile memory, such as for example, a flash memory, a random-access memory (RAM), a programable read only memory (PROM), a re-programmable memory (FLASH), and any combination thereof, or the like.

In some exemplary embodiments, the memory retains program code to activate controller 151 to perform acts associated with determining a pulse width modulation (PWM) signal that controls the full or half bridge driver 152. Driver 152 can adjust the output current flowing through Lt 110, i.e. power provided by the Tx 100, by modulating the OPF and/or duty cycle of the current flowing through Lt 110. In some exemplary embodiments, the PWM signal generated in the controller 151 tunes the modulation to satisfy the wireless charging needs of a load, such as device 20. In an alternative embodiment, the amplitude of the DC power supply may be controlled.

It should be noted that the PWM signal frequency and duty cycle can be set by controller 151, within the OPF range, as previously described. Additionally, controller 151 can change the OPF within the OPF range based on the power demand of the device 20.

In some exemplary embodiments, the controller 151 can utilize its memory to retain, connectivity software, monitoring information, configuration and control information and application associated with charging management of present disclosure system.

In some exemplary embodiments, the controller 151 can be configured to communicate with device 20 based on protocols that comply with the following communications standards: power matters alliance (PMA); wireless power consortium (WPC) and AirFuel Alliance. According to these communication methods, but not limited to, the controller 151 can be configured to acquire user's credentials from device 20 in order to authenticate users for granting and regulating charging services. Additionally, or alternatively, the controller 151 can be also configured to acquire from device 20, its power requirements.

It will also be noted that the solutions/procedures described hereinafter may utilize a calibration method disclosed in a co-pending application submitted by the applicant of the subject matter disclosed herein on the same date. The co-pending application is incorporated in its entirely by reference. In some exemplary embodiments, the calibration method may also yield determining of coupling factor (k) between a Tx 100 and a relay, JRF, MRF, OPF, OPF range, digital ping, and any combination thereof, or the like of the Tx 100. In some exemplary embodiments, the coupling factor (k) is a predetermined value.

One technical problem dealt with by the disclosed subject matter is unwanted metal objects (foreign objects) that can cause efficiency loss and possible safety hazards by absorbing portions of the electromagnetic field and heating up. Typically, unwanted metal objects such as coins, paper clips or metal objects attached to a cellphone case may be situated between, or near, a user's device (e.g. device 20) and a transmitter (e.g. relay 200 or relay 300) and may impact the magnetic field.

Conventional practice in the art nowadays calls for detecting the power loss of the system, and if the power loss exceeds a predetermined threshold, which can be caused by foreign objects, the system shuts down the power transfer. One technical solution is adding to the system disclosed herein a method for foreign objects detection (FOD) that can prevent this the possible impact and providing users with a safer design.

However, the system architecture of the present disclosure is characterized in splitting the transmitting functionality between Tx 100 and relay 200/300, and has no galvanic connection between the two. Moreover, power loss may be caused by medium 10, having unknown thickness and material properties. Thus, the lack of galvanic connection and the unknown medium situated between Tx 100 and relay 200/300 posse another technical problem that the present disclosure solve.

One technical solution is based on methods for determining the actual delivered power from either relay 200 or relay 300 to a user's device, such as device 20, by controller 151, and comparing it with a consumed power value, reported by the device 20. If the difference falls above a predefined threshold, the controller 151 concludes that a foreign object is present, and activates measures to mitigate the issue.

For the sake of simplifying the explanation of the FOD methods, relay 200 and relay 300 may be referred to as "relay", also coils Lr 210 and Lr 310 may be referred to as "Lr". It should be noted that the following methods apply for both relay 200 and relay 300 and their respected subcomponents.

Figure 4:
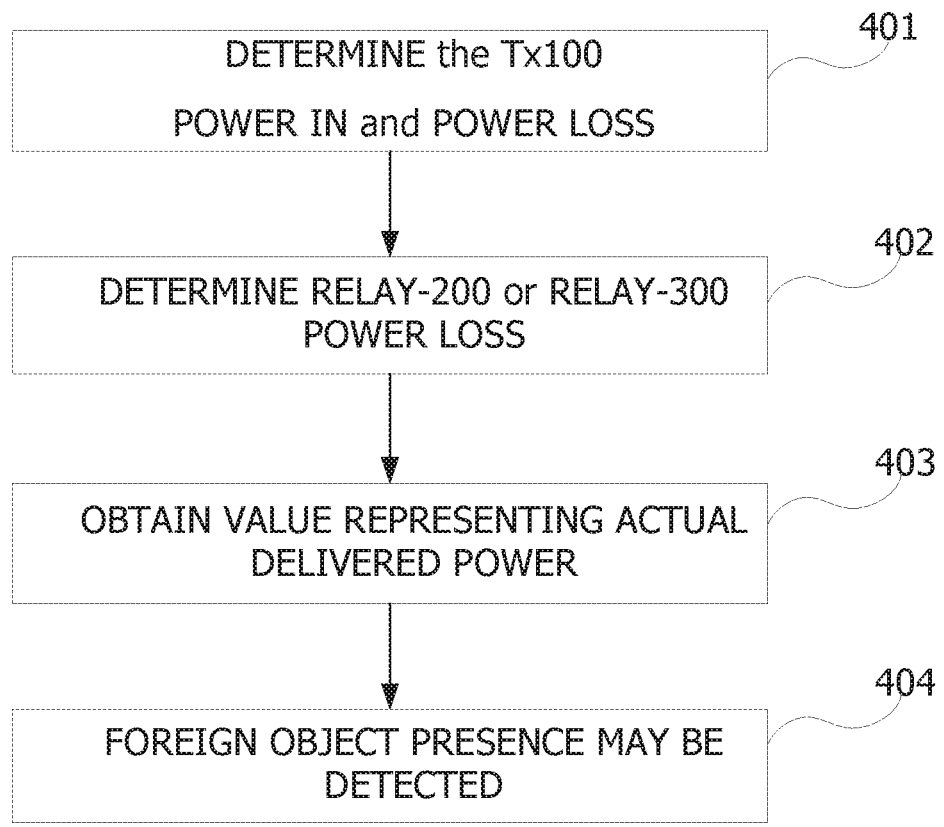
FIG. 4 shows a flowchart diagram of methods for foreign object detection, in accordance with some exemplary embodiments of the disclosed subject matter.

Referring now to FIG. 4 showing a flowchart diagram of methods for foreign object detection, in accordance with some exemplary embodiments of the disclosed subject matter.

In step 401, power consumed from the power supply PS 160 (Pin) determined, and a power loss (Ploss) of the Tx 100 may be determined. In some exemplary embodiments, the Ploss can be derived from calculating AC current of Tx 100 measurements and predetermined parasitic resistance parameters, retained in controller 151. Wherein, the Iac can be determined based on parameters measured and calculated by controller 151.

In one exemplary embodiments, Pin may be given by the following equations:

For driver 152 having half bridge:

$$Pin = \int\!\!\int_{-1/2f}^{1/2f} Vin(t)*I(t)dt = \int\!\!\int_{-D/2f}^{D/2f} Vin*I(t)dt$$

For driver 152 having full bridge:

$$Pin = \int\!\!\int_{-1/2f}^{1/2f} Vin(t)*I(t)dt = \int\!\!\int_{-D/2f}^{D/2f} Vin*I(t)dt + \int\!\!\int_{1/2f-D/2f}^{1/2f+D/2f} -Vin*I(t)dt$$

Where:
D indicates the duty cycle.
f indicates the operation frequency.
Vin indicates the input voltage to driver 152.
I(t) indicates the measured AC current over time.

In another exemplary embodiment, the determination of Pin may be based on calculations that assumes current flowing in the Lt 100 that are close to sinusoidal shape. Thus, the frequency response of the current flowing in the system can be mostly composed of a first harmonic and can be approximated as:

$$I(t) = I \cos(2\pi ft + \theta)$$

$$I(w) = I\, \delta(\pm 2\pi ft)e^{i\theta}$$

Where I is the current amplitude of the first harmonic.
Therefor the input power (Pin) may be expressed as follows:

$$\begin{aligned} Pin &= f\int_{-D/2f}^{D/2f} Vin*I\cos(2\pi ft+\theta) f\int_{1/2f-D/2f}^{1/2f+D/2f} -Vin*\\ & \quad I\cos(2\pi ft+\theta)\\ &= \left[\frac{Vin}{2\pi}*I\sin(2\pi ft+\theta)\right]_{-D/2f}^{D/2f} + \\ & \quad \left[\frac{-Vin}{2\pi}*I\sin(2\pi ft+\theta)\right]_{1/2f-D/2f}^{\frac{1}{2f}+D/2f}\\ &= \frac{Vin}{\pi}*I\,(\sin(\pi D+\theta) - \sin(-\pi D+\theta)) \end{aligned}$$

In order to determine Pin by the above equation, the peak and phase of the AC current can be measured by controller 151, preferably without sampling the entire AC current signal. In some exemplary embodiments, the AC current can be sampled by sensor 155, at least twice during a driving cycle, having a fixed time interval T1 between the at least two samples, wherein the sampling can be repeated for each driving cycle. It should be noted that the driving cycle can be a single period of an excitation wave frequency (w) generated by the PWM signal of the controller 151. Resulting from that, a plurality of pairs of measurements spaced in discrete (T1) intervals, of each driving cycle can be obtained. In some exemplary embodiments, the time between each drive cycle starts and the first sample (T2) can be a constant. The samples may be designated as (Sx, y), wherein x indicates the sample number in a pair, and y indicates the pair number. Thus, the following relations may be established:

$$\alpha = wT_1$$

$$\gamma = wT_2$$

$$\beta = \gamma + \theta$$

$$S_{1,n} = I\cos(2\pi n + \beta) + N(1, n)$$

$$S_{2,n} = I\cos(2\pi n + \beta + \alpha) + N(2, n)$$

Were N marks a noise function.

To reduce noise impact, averaging across multiple samples can be performed.

$$R = \frac{\Sigma S_{2,n}}{\Sigma S_{1,n}} = \frac{\Sigma I \cos(2\pi n + \beta + \alpha) + N(2,n)}{\Sigma I \cos(2\pi n + \beta) + N(1,n)} \cong \frac{\cos(\beta+\alpha)}{\cos(\beta)}$$

$$= \frac{\cos(\beta)\cos(\alpha) - \sqrt{1-\cos^2(\beta)}\sin(\alpha)}{\cos(\beta)}$$

Thus, the last arguments required for calculating Pin by the equation depicted above can be given by the following equation:

$$\cos(\beta) = \frac{\sin(\alpha)}{\sqrt{1 - 2R\cos(\alpha) + R^2}}$$

$$\theta = \mathrm{acos}\left(\frac{\sin(wT_1)}{\sqrt{1 - 2R\cos(wT_1) + R^2}}\right) - \gamma$$

Consequently, Ploss of the Tx 100 can be obtained from the following equation $$P_{loss} = I_{RMS}^2 R_p$$

Where, $I_{RMS}$ may be an RMS current of the Tx 100. The $I_{RMS}$ can be determined based on the full AC current curve I(t) as: $I_{RMS} = \sqrt{\int I(t)^2}$ Alternatively, $I_{RMS} = I/\sqrt{2}$ based on the first harmonic current amplitude I.

In yet another exemplary embodiment, determining Pin can be based on calculations that takes into consideration measurements of other harmonics, thus dealing with power loses due to higher harmonics. In such embodiment, the AC current can be sampled at a rapid rate to produce the samples $S_n$ where $T_1$ is the interval between samples, and $T_2$ is the interval from drive cycle phase 0 to the first sample.

In step 402, the power loss (Pr) wasted on the relay can be determine In some exemplary embodiments, the power wasted on the relay caused by its parasitic resistance, can be determined by using a function based on the measured DC voltage and/or AC current, analysis, simulation, empirical measurements and any combination thereof, or the like. Additionally, or alternatively, the function may depend on the properties of Lr, Lt 110, other components of Tx 100, operational frequency, distance between Tx 100 and the relay.

In some exemplary embodiments, the Pr wasted on the relay can be given by using the following equation.

$$P_r = \frac{R_r L_t Y_p I_{RMS}^2}{L_r Y_r}$$

Where:
$R_r$ indicates the known resistance of Lr and Cr 230
$L_t$ indicates the inductance of Lt 110
$L_r$ indicates the inductance of Lr $Yp = 1 - (fp/f)^2$ fp indicates the resonance frequency of the Tx 100 LC circuit.
f indicates the operation frequency.

$Yr = 1 - (fr/f)^2$ fr indicates the resonance frequency of the relay LC circuit.

$I_{RMS}$ indicates the RMS of the AC current

In other exemplary embodiments, the above equation can be dynamically calculated by using known properties of the Lr and Lt 110 and the complex AC current (amplitude and phase) measurements of the first harmonics.

The Lr coil reflected impedance may be given by:

$$Z_r(w) = \frac{2Vin}{\pi I(w)} - (iwL_p Y_p(w) + R_p)$$

The Lr absolute current (assuming only first harmonic contribution) may be:

$$I_r = \frac{Iwk\sqrt{L_p L_r}}{|Z_r(w)|}$$

wherein, w is the angular frequency of the drive.
Thus, the Lr power loss Pr may be:

$$P_r = \frac{(I_{RMS} wk)^2 L_p L_r R_r}{|Z_r(w)|^2}$$

were k is the coupling factor

In yet another exemplary embodiment, the above equation may be dynamically calculated by using known properties of the Lr and Lt 110 and the complex AC current (amplitude and phase) measurements of other harmonics. In such embodiments where multiple harmonics calculation is performed, the power per harmonic is calculated and then power from all harmonics is summed to determine the total power loss Pr on the relay.

In step 403, an actual power delivered to a user's device such as device 20 can be determined In some exemplary embodiments, the controller 151 can utilize communication protocols such as PMA, WPC, AirFuel, or the like, to obtain a value of the obtained power from device 20.

In step 404, a foreign object presence is to be detected. In some exemplary embodiments, an FOD outcome may be provided if the sum of Tx 100 power loss (Ploss) plus the relay (relay 200 or relay 300) power loss (Pr) exceeds a predetermined power loss threshold that correspond to the actual power delivered to device 20. In some exemplary embodiments, the Tx 100 may cease the power transfer.

The components detailed above can be implemented as one or more sets of interrelated computer instructions, executed for example by controller 151 or by another processor. The components are arranged as one or more executable files, dynamic libraries, static libraries, methods, functions, services, or the like, programmed in any programming language and under any computing environment.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A method for a foreign object detection in a system having a relay adapted to inductively transfer power to charge a device and a transmitter having a controller configured to control a driver for inductively transmitting to the relay the power to charge the device, wherein the transmitter and the relay are separated by a medium, wherein the controller is capable of communicating with the device, the method comprising operations by the controller:
   determining a power consumed by the transmitter;
   determining a power loss on the transmitter according to continuous measurements of an AC output current;
   obtaining a coupling factor between the transmitter and the relay;
   determining a power loss on the relay based on the obtained coupling factor and the continuous measurements of AC output current;
   subtracting from the power consumed by the transmitter the power loss on the transmitter and the power loss on the relay to produce a result;
   obtaining from the device consumed power of the device;
   comparing the result to the consumed power of the device; and
   determining the foreign object presence based on the comparison,
   wherein the determining of the power loss on the transmitter is based a multiplication of a known resistance and a calculation reflecting impedance.

2. The method of claim 1, wherein the determining the power loss on the relay is also based on an operational frequency of the transmitter and joint resonance frequencies of the relay and the transmitter.

3. The method of claim 2, wherein upon said determining foreign object presence the controller ceases said inductively transfer power or changes the operational frequency for minimum inductively transfer power.

4. The method of claim 1, wherein the measurements of the AC output current are sampled from a point between the controller and a coil of the transmitter or between the driver and the coil of the transmitter.

5. The method of claim 1, wherein the continuous measurements of AC output current comprise peak and phase measurements.

6. The method of claim 5, wherein the peak and phase measurements are sampled at least twice during a driving cycle with respect to a fixed time interval therebetween.

7. The method of claim 6, wherein the controller takes an average across multiple samples noise.

8. The method of claim 1, wherein the coupling factor is a predetermined value that is greater than 0.15.

9. The method of claim 8, wherein the predetermined value is greater than 0.25 for the medium comprising a thickness of up to 30 millimeters.

10. A transmitter for wirelessly charging a device via a relay, the transmitter and the relay being separated by a medium, wherein the transmitter comprises a controller configured to communicate with the device and detect a foreign object between the device and the transmitter by:
    determining a power loss on the transmitter according to continuous measurements of AC output current and a power consumed by the transmitter;
    obtaining a consumed power of the device from the device and a coupling factor between the transmitter and the relay;
    determining a power loss on the relay based on the continuous measurements of AC output current and the obtained coupling factor;
    determining a calculation result from the power loss on the transmitter, the power loss on the relay, and the power consumed by the transmitter; and
    determining a presence of the foreign object based on a comparison between the calculation result to the consumed power of the device,
    wherein the determining of the power loss on the transmitter is based a multiplication of a known resistance and a calculation reflecting impedance.

11. The transmitter of claim 10, wherein the determining of the power loss on the relay is also based on an operational frequency of the transmitter and joint resonance frequencies of the relay and the transmitter.

12. The transmitter of claim 11, wherein the controller is configured to cease the wirelessly charging of the device via the relay by the transmitter or change the operational frequency for minimum inductively transfer power upon the determining of the foreign object presence.

13. The transmitter of claim 10, wherein the measurements of the AC output current are sampled from a point between the controller and a coil of the transmitter or between the driver and the coil of the transmitter.

14. The transmitter of claim 10, wherein the continuous measurements of AC output current comprise peak and phase measurements.

15. The transmitter of claim 14, wherein the peak and phase measurements are sampled at least twice during a driving cycle with respect to a fixed time interval therebetween.

16. The transmitter of claim 15, wherein the controller takes an average across multiple samples noise.

17. The transmitter of claim 10, wherein the coupling factor is a predetermined value that is greater than 0.15.

18. The transmitter of claim 17, wherein the predetermined value is greater than 0.25 for the medium comprising a thickness of up to 30 millimeters.

19. The method of claim 1, wherein an AC current sensor of the transmitter, positioned relative to a coil side of the transmitter, performs continuous measurements of the AC output current.

* * * * *